(12) United States Patent
Sung et al.

(10) Patent No.: US 10,146,346 B2
(45) Date of Patent: Dec. 4, 2018

(54) TOUCH DISPLAY DEVICE WITH CAPACITOR HAVING LARGE CAPACITANCE

(71) Applicant: InnoLux Corporation, Miao-Li County (TW)

(72) Inventors: Li-Wei Sung, Miao-Li County (TW); Yu-Chien Kao, Miao-Li County (TW); Hsieh-Li Chou, Miao-Li County (TW); Yu-Ti Huang, Miao-Li County (TW); Yu-Che Chang, Miao-Li County (TW); Chung-Le Chen, Miao-Li County (TW); Hung-Hsun Chen, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 148 days.

(21) Appl. No.: 14/989,988

(22) Filed: Jan. 7, 2016

(65) Prior Publication Data
US 2016/0216820 A1    Jul. 28, 2016

Related U.S. Application Data

(60) Provisional application No. 62/188,088, filed on Jul. 2, 2015, provisional application No. 62/108,153, filed on Jan. 27, 2015.

(30) Foreign Application Priority Data

Oct. 13, 2015   (TW) .............................. 104133474 A

(51) Int. Cl.
*H01L 33/08*     (2010.01)
*G06F 3/041*     (2006.01)

(52) U.S. Cl.
CPC .................................. *G06F 3/0412* (2013.01)

(58) Field of Classification Search
CPC ..... G06F 3/0412; G06F 3/044; G09G 3/3677; G09G 3/3611; G11C 19/28; H01L 28/60;
(Continued)

(56) References Cited

U.S. PATENT DOCUMENTS

2007/0274433 A1* 11/2007 Tobita ................... G09G 3/3677
                                                                 377/64
2010/0067646 A1*  3/2010 Liu ........................ G11C 19/28
                                                                 377/69
(Continued)

FOREIGN PATENT DOCUMENTS

CN        102341910 A      2/2012
CN        103943083 A      7/2014

OTHER PUBLICATIONS

Chinese language office action dated May 22, 2018, issued in application No. CN 201510669934.9.

*Primary Examiner* — Jennifer Mehmood
*Assistant Examiner* — James Nokham
(74) *Attorney, Agent, or Firm* — McClure, Qualey & Rodack, LLP

(57) ABSTRACT

A touch display device including a touch display panel and a data line driving circuit is provided. The touch display panel includes a plurality of pixels and a first shift register unit. The first shift register unit provides a first shifted signal to a first portion of the pixels. A first transistor receives a clock signal, is coupled to an output node, and outputs the first shifted signal. A second transistor receives a first trigger signal, is coupled to the first transistor. A third transistor is coupled to the second transistor, receives a first operation voltage and a second trigger signal. A fourth transistor is coupled to the first source, receives a second operation voltage and the second trigger signal. A capacitor is coupled
(Continued)

between the first transistor and stacked by a first metal layer, a second metal layer, and a third metal layer.

10 Claims, 11 Drawing Sheets

(58) Field of Classification Search
CPC .. H01L 33/08; H01L 27/1255; H01L 27/1225
See application file for complete search history.

(56) References Cited

U.S. PATENT DOCUMENTS

| | | | | | |
|---|---|---|---|---|---|
| 2010/0238122 | A1* | 9/2010 | Chang | ................... | G06F 3/0412 345/173 |
| 2011/0012880 | A1* | 1/2011 | Tanaka | ................. | G09G 3/3677 345/211 |
| 2011/0127524 | A1* | 6/2011 | Yamazaki | ........... | H01L 27/1225 257/43 |
| 2012/0105393 | A1* | 5/2012 | Tan | ...................... | G09G 3/3677 345/204 |
| 2012/0161820 | A1* | 6/2012 | Koo | ..................... | G09G 3/3611 327/109 |
| 2012/0256817 | A1* | 10/2012 | Chen | ...................... | G11C 19/28 345/92 |
| 2014/0034954 | A1* | 2/2014 | Yamazaki | ........... | H01L 27/1255 257/59 |
| 2014/0078128 | A1* | 3/2014 | Nam | ...................... | G11C 19/28 345/212 |
| 2014/0210771 | A1* | 7/2014 | Kim | ....................... | G06F 3/044 345/174 |
| 2014/0291803 | A1* | 10/2014 | Lin | ........................ | H01L 28/60 257/532 |

* cited by examiner

TOUCH DISPLAY DEVICE WITH CAPACITOR HAVING LARGE CAPACITANCE

CROSS REFERENCE TO RELATED APPLICATIONS

This application claims the benefit of U.S. Provisional Application No. 62/108,153 filed Jan. 27, 2015, and U.S. Provisional Application No. 62/188,088, filed Jul. 2, 2015, which applications are hereby incorporated by reference in the entirety.

This Application also claims priority of Taiwan Patent Application No. 104133474, filed on Oct. 13, 2015, the entirety of which is incorporated by reference herein.

BACKGROUND OF THE INVENTION

Field of the Invention

The invention relates to a touch display device, and more particularly to a touch display device with a capacitor constituted by three metal layers.

Description of the Related Art

For an in-cell touch panel, a touch sensing operation is performed in a blanking period in each display frame. Each display frame usually comprises an active period and a blanking period. During the active period, the gate line driving circuit on the panel generates corresponding scan signals. During the blanking period, the gate line driving circuit on the panel stops generating the corresponding scan signals. At this period, a touch sensing operation is performed to determine whether the panel is touched and determine the touched position. After the touch sensing operation is finished, the gate line driving circuit on the panel continually generates the corresponding scan signals. However, since the gate line driving circuit has a current leakage, the gate line driving circuit may not continually generate the corresponding scan signals.

BRIEF SUMMARY OF THE INVENTION

In accordance with an embodiment, a touch display device comprises a touch display panel and a data line driving circuit. The touch display panel comprises a plurality of pixels and a first shift register unit. The first shift register unit is configured to provide a first shifted signal to a first portion of the pixels and comprises a first transistor, a second transistor, a third transistor, a fourth transistor, and a capacitor. The first transistor comprises a first drain receiving a clock signal, a first source coupled to an output node, and a first gate outputting the first shifted signal. The second transistor comprises a second drain receiving a first trigger signal, a second source coupled to the first gate, and a second gate coupled to the second drain. The third transistor comprises a third drain coupled to the second source, a third source receiving a first operation voltage, and a third gate receiving a second trigger signal. The fourth transistor comprises a fourth drain coupled to the first source, a fourth source receiving a second operation voltage, and a fourth gate receiving the second trigger signal. The capacitor is coupled between the first gate and the first source and stacked by a first metal layer, a second metal layer, and a third metal layer. The data line driving circuit is configured to provide a plurality of data signals to the pixels.

In accordance with another embodiment, a touch display device comprises a substrate, a data line driving circuit, a sensing electrode, a liquid-crystal layer, and a color filter layer. The substrate comprises a plurality of pixels and a gate on panel (GOP) circuit. The GOP circuit comprises a first shift register unit. The first shift register unit is configured to provide a first shifted signal to a portion of the pixels and comprises a first transistor, a second transistor, a third transistor, a fourth transistor, and a capacitor. The first transistor comprises a first drain receiving a clock signal, a first source coupled to an output node to output the first shifted signal, and a first gate. The second transistor comprises a second drain receiving a first trigger signal, a second source coupled to the first gate, and a second gate coupled to the second drain. The third transistor comprises a third drain coupled to the second source, a third source a first operation voltage, and a third gate receiving a second trigger signal. The fourth transistor comprises a fourth drain coupled to the first source, a fourth source receiving a second operation voltage, and a fourth gate receiving the second trigger signal. The capacitor is coupled to the first gate and the first source and stacked by a first metal layer, a second metal layer, and a third metal layer. The data line driving circuit is configured to provide a plurality of data signals to the pixels. The sensing electrode is formed on the substrate. The liquid-crystal layer is disposed on the sensing electrode. The color filter layer is disposed on the liquid-crystal layer.

A detailed description is given in the following embodiments with reference to the accompanying drawings.

BRIEF DESCRIPTION OF THE DRAWINGS

The invention can be more fully understood by referring to the following detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
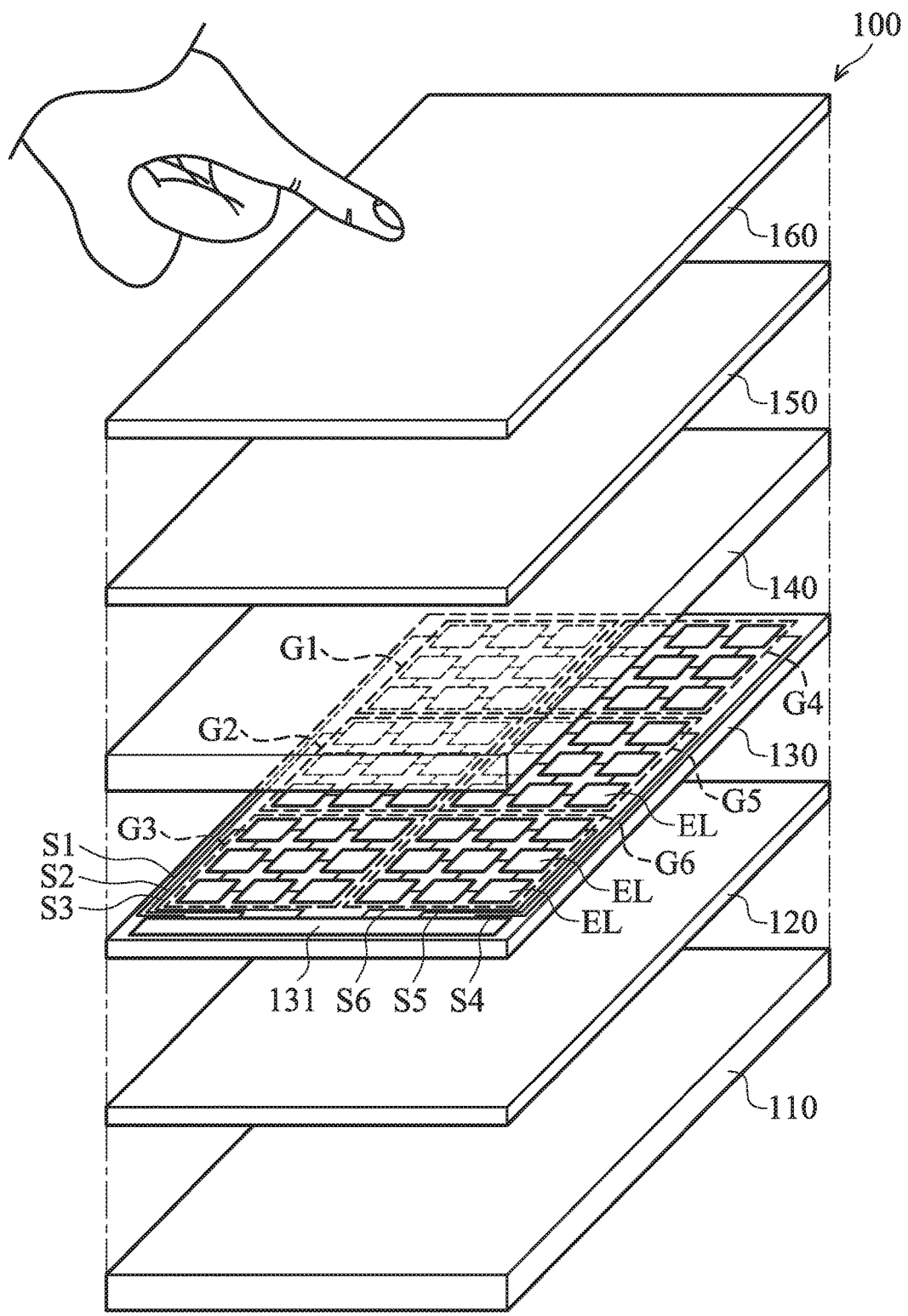
FIG. 1 is a schematic diagram of an exemplary embodiment of a touch display device according to an embodiment of the present invention.

FIG. 1 is a schematic diagram of an exemplary embodiment of a touch display device according to an embodiment of the present invention. The touch display device 100 comprises a substrate 110, a pixel electrode layer 120, a common electrode layer 130, a liquid-crystal layer 140, a color filter layer 150 and a protection layer 160. In this embodiment, the substrate 110 is an in-cell touch panel and comprises a plurality of pixels (not shown) and elements (not shown) driving the pixels.

The pixel electrode layer 120 comprises a plurality of metal pattern (not shown) served pixel electrodes. The common electrode layer 130 comprises a plurality of patterned common electrodes EL. In this embodiment, the common electrodes EL is divided into groups G1~G6. The common electrodes in each group are electrically connected with one another. The groups G1~G6 are separated with one another. For example, the common electrodes in group G1 are not electrically connected to the common electrodes in groups G2~G6. In this embodiment, each group comprises nine common electrodes EL, but the disclosure is not limited thereto. In some embodiments, each group comprises at least one common electrode EL.

The common electrodes EL perform different functions in different modes. For example, in a display mode, the common electrodes EL serve as common electrodes to receive a common voltage, and in a touch sensing mode, the common electrodes EL stop receiving the common voltage. At this time, the common electrodes EL serve as touch electrodes. The touch processor 131 provides driving signals to the common electrodes EL in the groups G1~G6 via the signal lines S1~S6. The touch processor 131 detects the change of the capacitance of the capacitor between each common electrode EL and a touching object, such as a finger, to obtain the contact position of the touching object. In one embodiment, each common electrode EL covers at least one pixel.

The liquid-crystal layer 140 is disposed between the common electrode layer 130 and the color filter layer 150. The voltage difference between the pixel electrodes (not shown) of the pixel electrode layer 120 and the common electrodes EL of the common electrode layer 130 controls the arrangement of the liquid-crystal in the liquid-crystal layer 140. The protection layer 160 is disposed on the color filter layer 150. In this embodiment, the common electrode layer 130 is disposed on the pixel electrode layer 120 such that the touch display device 100 is referred to as a top-com device. In other embodiments, when the pixel electrode layer 120 is disposed on the common electrode layer 130, the touch display device 100 is referred to as a top-pixel device.

Figure 2A:
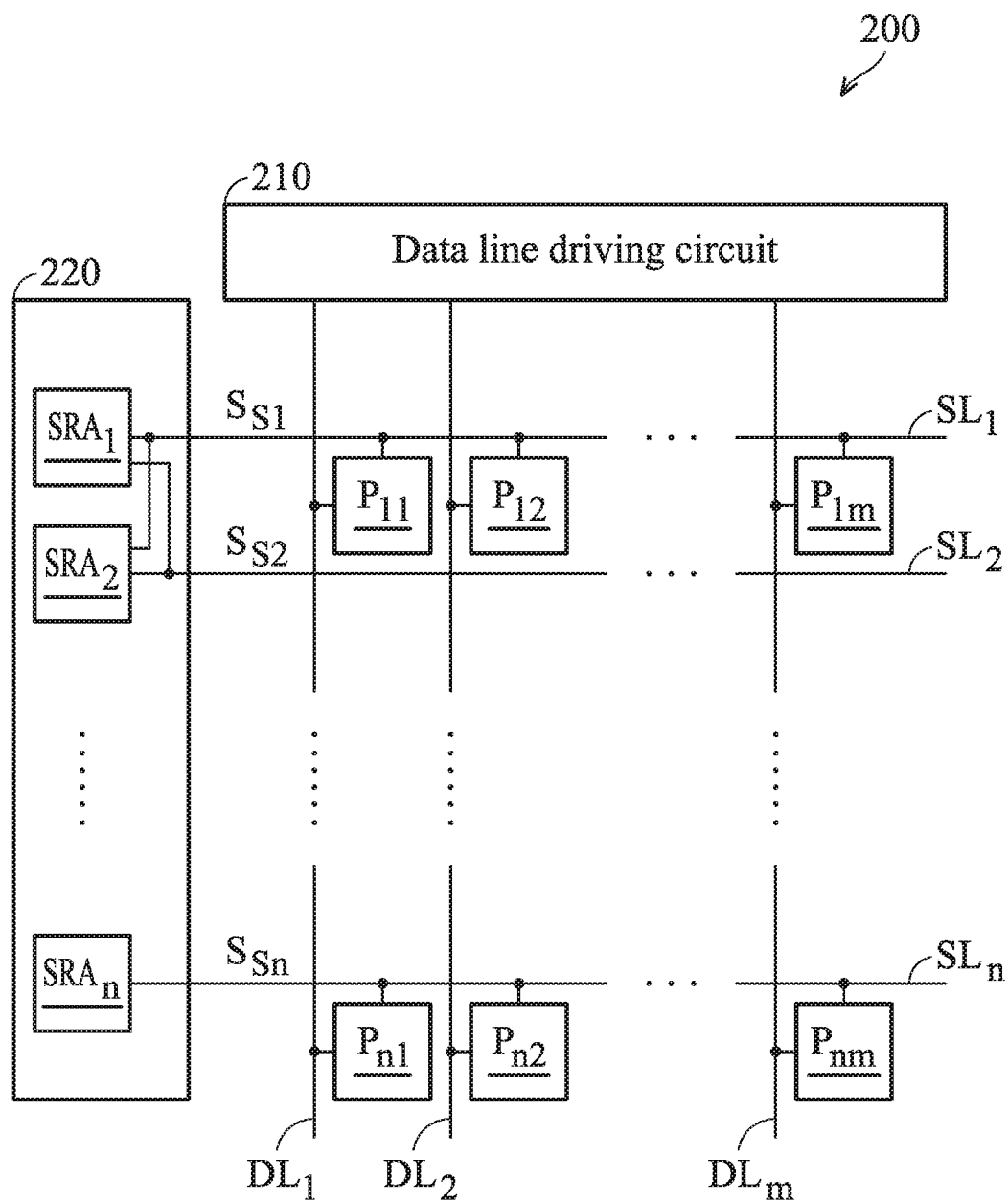
FIG. 2A is a schematic diagram of an exemplary embodiment of the substrate according to an embodiment of the present invention.

FIG. 2A is a schematic diagram of an exemplary embodiment of the substrate according to an embodiment of the present invention. In this embodiment, the substrate is a touch display panel 200. The touch display panel 200 comprises a data line driving circuit 210, a gate on panel (GOP) circuit 220, pixels $P_{11}$~$P_{nm}$, data lines $DL_1$~$DL_m$, and scan lines $SL_1$~$SL_n$. The data lines $DL_1$~$DL_m$ are coupled between the data line driving circuit 210 and the pixels $P_{11}$~$_{nm}$ to transmit data signals generated by the data line driving circuit 210 to the pixels $P_{11}$~$P_{nm}$. In one embodiment, the data line driving circuit 210 and the GOP circuit 220 are integrated into a circuit or are individually disposed in the touch display panel 200.

The GOP circuit 220 comprises shift register units $SRA_1$~$SRA_n$. The scan lines $SL_1$~$SL_n$ are coupled between the shift register units $SRA_1$~$SRA_n$ and the pixels $P_{11}$~$P_{nm}$. The scan lines $SL_1$~$SL_n$ are configured to transmit the shifted signals $S_{S1}$~$S_{Sn}$ to the pixels $P_{11}$~$P_{nm}$. In this embodiment, each shift register unit provides a shifted signal to the next shift register unit and the pixels arranged in the same row (in a horizontal direction) and receives the shifted signal generated by the previous shift register unit. Taking the shift register unit $SRA_1$ as an example, the shift register unit $SRA_1$ generates the shifted signal $S_{S1}$ and provides the shifted signal $S_{S1}$ to the shift register unit $SRA_2$ and the first row of the pixels (e.g. $P_{11}$~$P_{1m}$) arranged in a matrix and receives the shifted signal $S_{S2}$ generated by the shift register unit $SRA_2$.

Figure 2B:
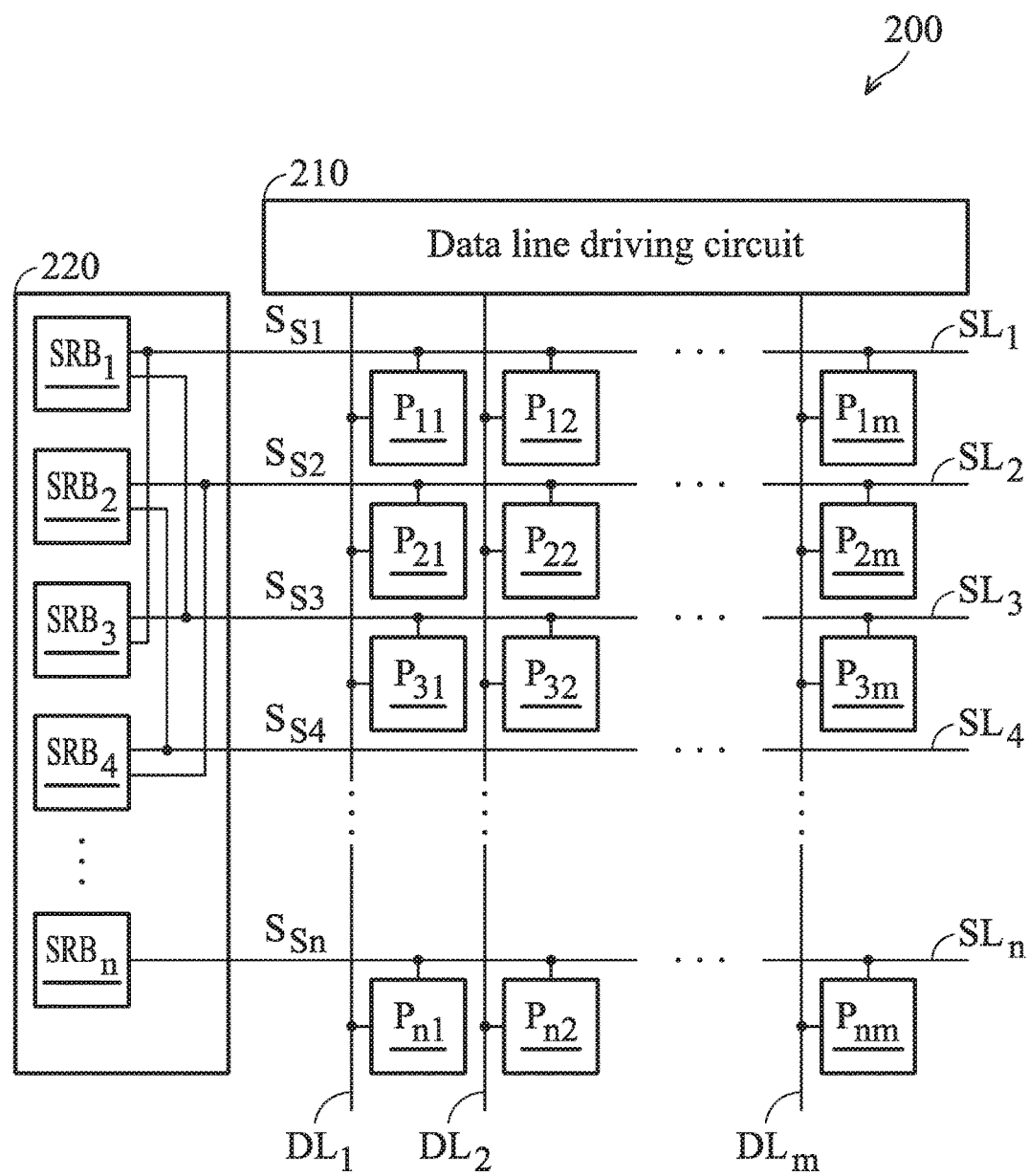
FIG. 2B is a schematic diagram of another exemplary embodiment of the substrate according to an embodiment of the present invention.

FIG. 2B is a schematic diagram of another exemplary embodiment of the substrate according to an embodiment of the present invention. FIG. 2B is similar to FIG. 2A except that each of the shift register units $SRB_1$~$SRB_n$ provides a shifted signal to the shift register unit after the next shift register unit and receives a shifted signal provided by the shift register unit after the next shift register unit. Taking the shift register unit $SRB_1$ as an example, the shift register unit $SRB_1$ generates the shifted signal $S_{S1}$ and provides the shifted signal $S_{S1}$ to the shift register unit $SRB_3$ and the first row of the pixels (e.g. $P_{11}$~$P_{1m}$) in a matrix and receives the shifted signal $S_{S3}$ provided by the shift register unit $SRB_3$.

Figure 3A:
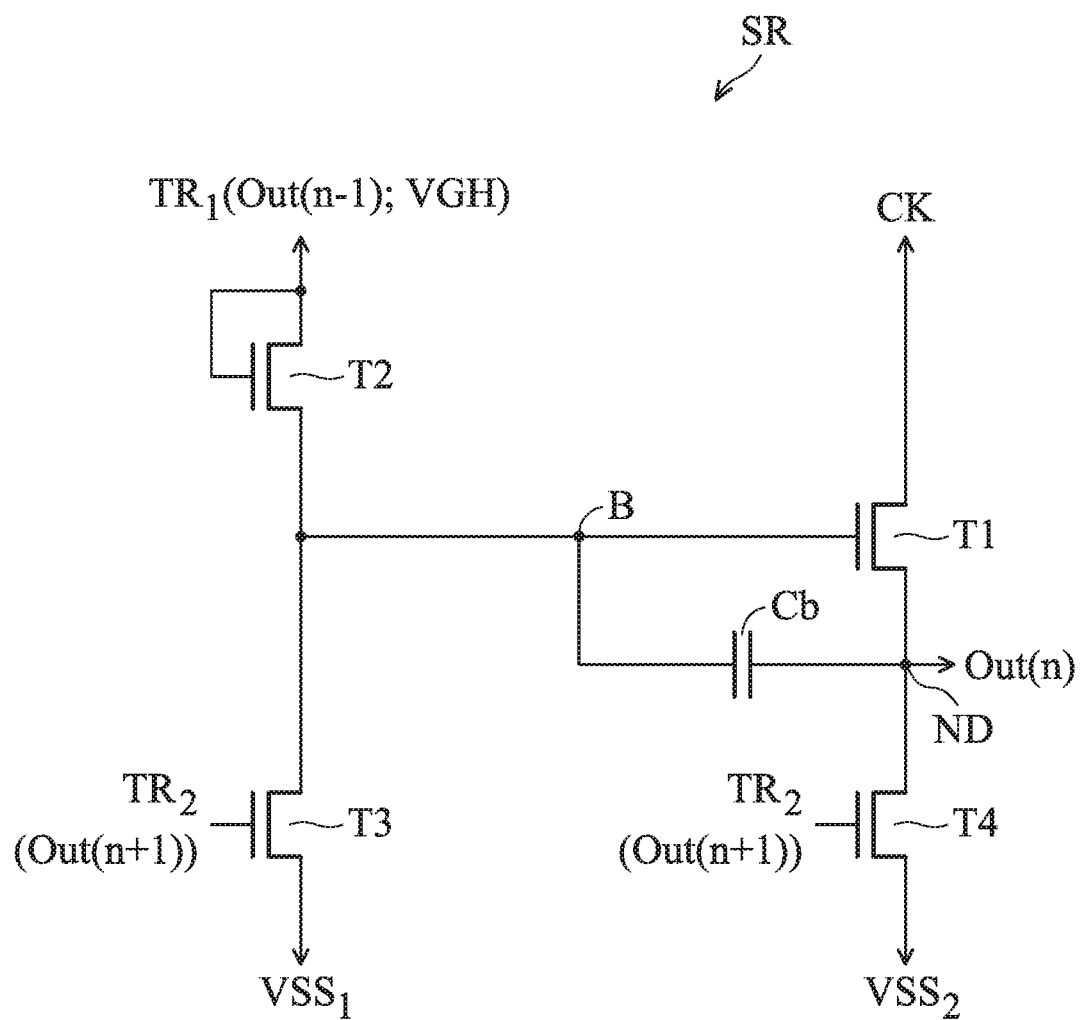
FIG. 3A is a schematic diagram of an exemplary embodiment of a shift register unit according to an embodiment of the present invention.

FIG. 3A is a schematic diagram of an exemplary embodiment of a shift register unit according to an embodiment of the present invention. Since the operations of the shift register units are the same, a single shift register unit is shown in FIG. 3A. The shift register unit SR comprises transistors T1~T4 and a capacitor Cb. In one embodiment, the transistors T1~T4 are N-type thin-film transistors (TFTs), but the disclosure is not limited thereto. In some embodiments, at least one of the transistors T1~T4 is a P-type transistor.

The drain of the transistor T1 receives a clock signal CK. The source of the transistor T1 is coupled to an output node ND to output a shifted signal Out(n). The drain and the gate of the transistor T2 are connected with one another and receive a trigger signal $TR_1$. The source of the transistor T2 is coupled to the gate of the transistor T1. In one embodiment, the trigger signal $TR_1$ is the shifted signal Out(n−1) generated by the previous shift register unit. In other embodiment, the trigger signal $TR_1$ is a DC signal VGH. The level of the DC signal VGH is a fixed level. Additionally, when the shift register unit SR is served as a first stage shift register unit, the trigger signal $TR_1$ is a predetermined start signal.

The drain of the transistor T3 is coupled to the source of the transistor T2. The source of the transistor T3 receives an operation voltage $VSS_1$. The gate of the transistor T3 receives another trigger signal $TR_2$. In one embodiment, the trigger signal $TR_2$ is the shifted signal Out(n+1) generated by the next shift register unit. In another embodiment, the level of the operation voltage $VSS_1$ is a negative level.

The drain of the transistor T4 is coupled to the source of the transistor T1. The source of the transistor T4 receives another operation voltage $VSS_2$. The gate of the transistor T4 receives the trigger signal $TR_2$. In one embodiment, the level of the operation voltage $VSS_2$ is equal to that of the operation voltage $VSS_1$, but the disclosure is not limited thereto. In this embodiment, the operation voltage $VSS_2$ has difference levels in different modes. For example, in a display mode, the operation voltage $VSS_2$ is at a first level, and in a touch sensing mode, the operation voltage $VSS_2$ is at a second level different from the first level. In one embodiment, the first level is less than the second level. For example, the first level may be a negative level, and the second level is a ground level of a positive level. In other embodiments, although the operation voltage $VSS_2$ may be at the first or second level, the operation voltage $VSS_1$ is maintained at the first level.

The capacitor Cb is coupled between the gate and the source of the transistor T1 and stacked by a first metal layer, a second metal layer, and a third metal layer. In one embodiment, the first metal layer comprises mask electrodes, the second metal layer comprises scan lines, and the third metal layer comprises data lines. In another embodiment, the first metal layer comprises scan lines, the second metal layer comprises data lines, and the third metal layer comprises common electrodes EL. In some embodiments, the capacitor Cb is disposed in an edge area of the touch display panel 200, such as a non-display area.

In a display mode, the capacitor Cb stores charges and drives the transistor T1 to generate the corresponding shifted signal. In a touch sensing mode, the shift register unit SR stops generating the shifted signal. At this time, the voltage of the capacitor Cb is reduced because of a current leakage. Therefore, after touch display panel 200 exits the touch sensing mode and enters the display mode, the voltage of the capacitor Cb is insufficient to drive the transistor T1 such that the shift register unit SR cannot provide the corresponding shifted signal. However, in this embodiment, the capacitor Cb is stacked by three metal layers, the capacitor Cb has a large capacitance to store large charges. Therefore, after touch display panel 200 exits the touch sensing mode and enters the display mode, the capacitor Cb provides the voltage enough to drive the transistor T1.

In addition, in the touch sensing mode, the operation voltage $VSS_2$ is changed from the first level to the second level. Because of a coupling effect of the capacitor Cb when the second level is greater than the first level, the voltage of the capacitor Cb is increased. Therefore, in the display mode following the touch sensing mode, the capacitor Cb provides the voltage enough to drive the transistor T1. In other embodiments, the channel lengths of the transistors T2 and T3 are increased to reduce the current leakage.

Figure 3B:
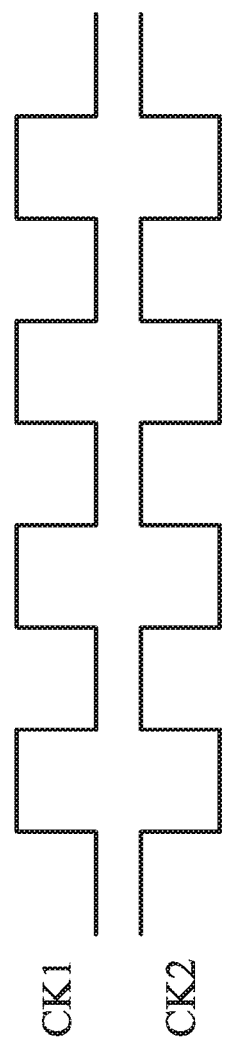
FIGS. 3B~3D are schematic diagrams of exemplary embodiments of the clock signal CK according to an embodiment of the present invention.
Figure 3C:
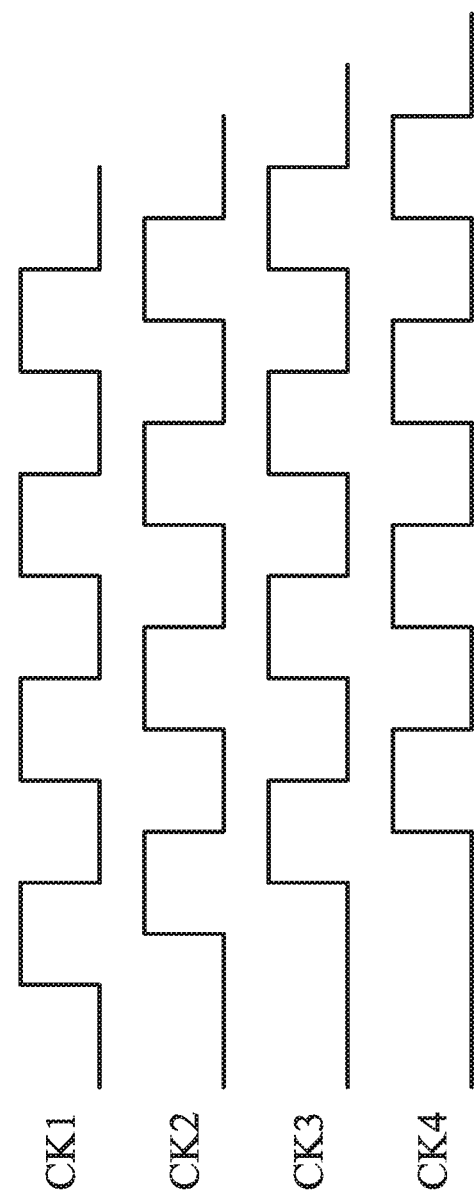
Figure 3D:
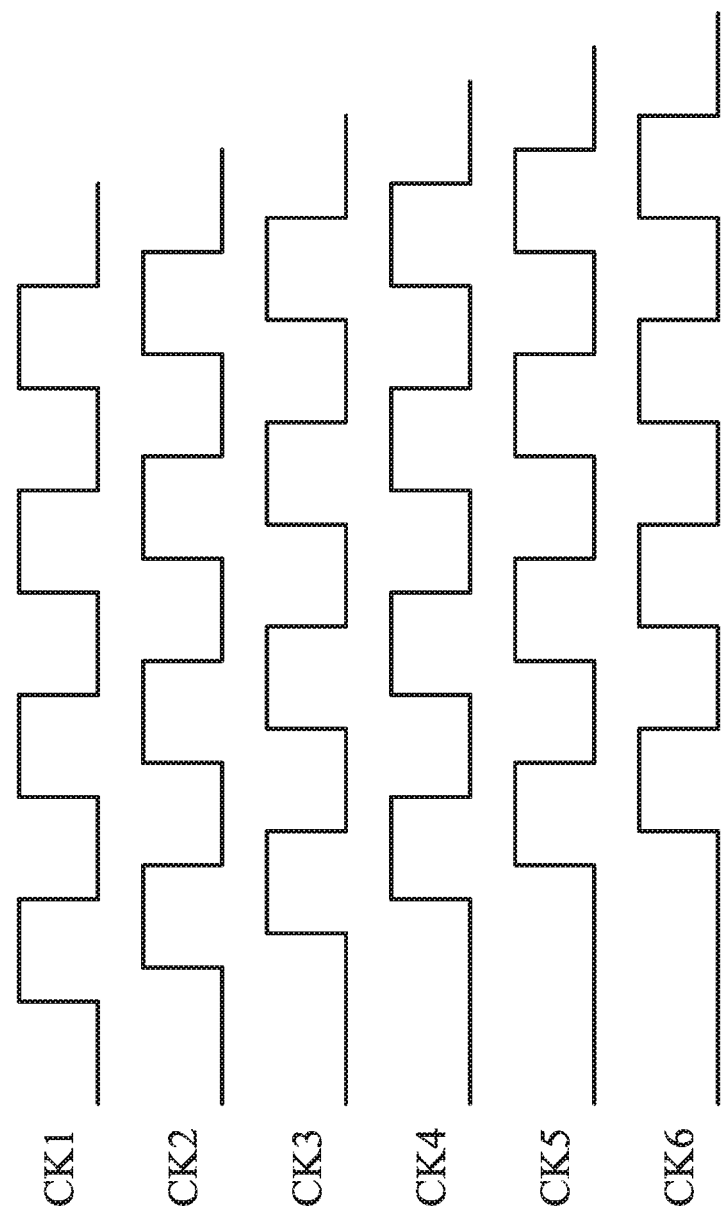

FIGS. 3B~3D are schematic diagrams of exemplary embodiments of the clock signal CK according to an embodiment of the present invention. In FIG. 3B, the clock signal CK1 is served as the clock signal CK of the odd stage shift register units, and the clock signal CK2 is served as the clock signal CK of the even stage shift register units. In this case, the clock signal CK1 is opposite to the clock signal CK2.

In FIG. 3C, the clock signals CK1~CK4 are provided to four successive shift register units, respectively. Taking the shift register units $SR_1$~$SR_8$ as an example, the clock signals CK1~CK4 serve as the clock signals CK of the shift register units $SR_1$~$SR_4$, respectively and serve as the clock signals CK of the shift register units $SR_5$~$SR_5$, respectively. In other words, the shift register units $SR_1$ and $SR_5$ receive the same clock signal, such as CK1. The shift register units $SR_2$ and $SR_6$ receive the same clock signal, such as CK2. The shift register units $SR_3$ and $SR_7$ receive the same clock signal, such as CK3. The shift register units $SR_4$ and $SR_8$ receive the same clock signal, such as CK4. In this case, the clock signal CK1 is opposite to the clock signal CK3, and the clock signal CK2 is opposite to the clock signal CK4. Furthermore, the rising edge of the clock signal CK1 leads the rising edge of the clock signal CK2.

In FIG. 3D, the clock signals CK1~CK6 are provided to six successive shift register units, respectively. Taking the shift register units $SR_1$~$SR_{12}$ as an example, the clock signals CK1~CK6 serve as the clock signal CK of the shift register units $SR_1$~$SR_6$, respectively and serve as the clock signal CK of the shift register units $SR_7$~$SR_{12}$, respectively. In this case, the clock signal CK1 is opposite to the clock signal CK4, the clock signal CK2 is opposite to the clock signal CK5, and the clock signal CK3 is opposite to the clock signal CK6. Additionally, the rising edge of the clock signal CK1 leads the rising edge of the clock signal CK2, and the rising edge of the clock signal CK2 leads the rising edge of the clock signal CK3.

Figure 3E:
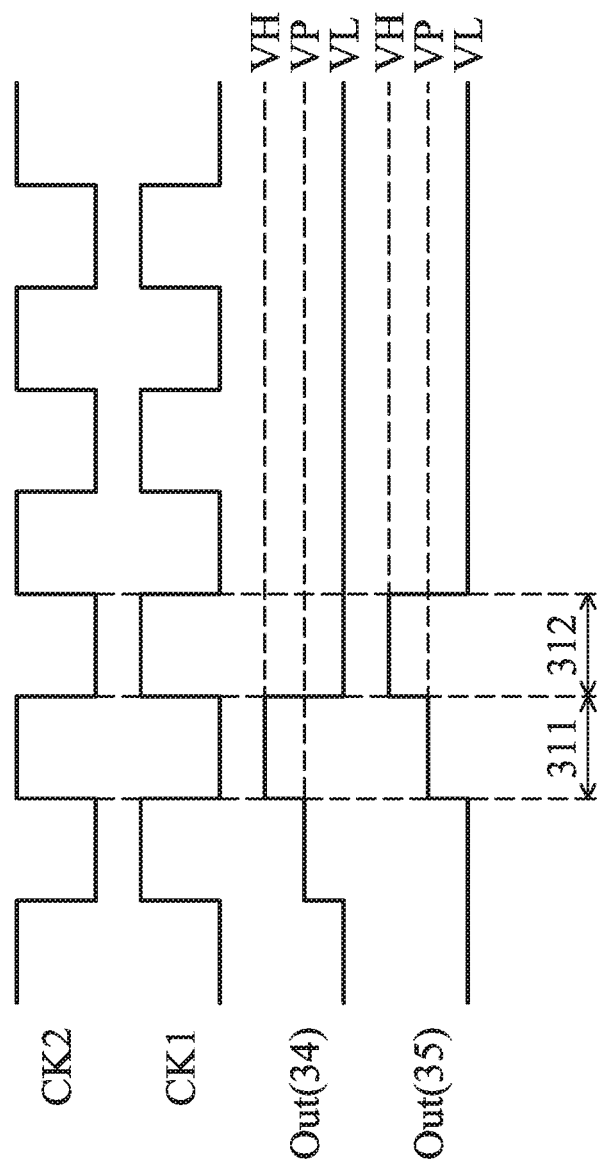
FIG. 3E is a timing schematic diagram of an exemplary embodiment of the shift register unit of FIG. 3A according to an embodiment of the present invention.

FIG. 3E is a timing schematic diagram of an exemplary embodiment of the shift register unit of FIG. 3A according to an embodiment of the present invention. The symbol CK2 represents the clock signal received by the $34^{th}$ stage shift register unit. The symbol CK1 represents the clock signal received by the $35^{th}$ stage shift register unit. The symbol Out(34) represents the shifted signal generated by the $34^{th}$ stage shift register unit. The symbol Out(35) represents the shifted signal generated by the $35^{th}$ stage shift register unit.

During the period 311, since the shifted signal Out(34) is at the level VH, the transistor T2 in the $35^{th}$ stage shift register unit is turned on to charge the capacitor Cb in the $35^{th}$ stage shift register unit. Therefore, the shifted signal Out(35) is pre-charged from the level VL to the level VP.

During the period 312, since the clock signal CK2 is at a low level, the shifted signal Out(34) is changed from the level VH to the level VL. Therefore, the transistor T2 of the $35^{th}$ stage shift register unit is turned off. At this time, the capacitor Cb of the $35^{th}$ stage shift register unit is charged such that the transistor T1 is turned on. Since the clock signal CK1 is at a high level, the transistor T1 of the $35^{th}$ stage shift register unit is completely turned on. Therefore, the shifted signal Out(35) is changed from the level VP to the level VH.

Figure 4:
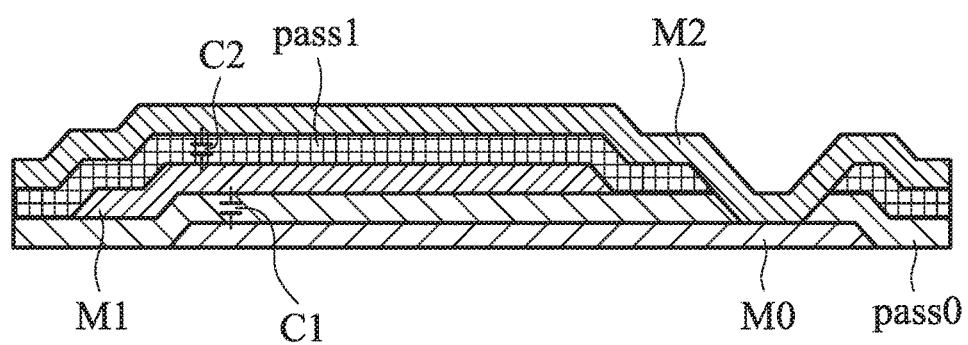
FIG. 4 is a cross sectional view of an exemplary embodiment of the capacitor Cb according to an embodiment of the present invention.

FIG. 4 is a cross sectional view of an exemplary embodiment of the capacitor Cb according to an embodiment of the present invention. First, patterns are formed in the metal layer M0. Then, a passivation layer pass0 is deposited on the metal layer M0. Then, patterns are defined in the metal layer M1 disposed on the passivation layer pass0. At this time, a capacitor C1 is stacked by the metal layer M0, the passivation layer pass0 and the metal layer M1. Then, a passivation layer pass1 is deposited on the metal layer M1. In one embodiment, the passivation layer pass1 is a gate nitride. Then, the passivation layer pass1 is etched and then a conductive channel layer M2 is deposited such that the conductive channel layer M2 is electrically connected to the metal layer M0. A capacitor C2 is stacked by the metal layer M1, the passivation layer pass1 and the conductive channel layer M2. The capacitor C2 is connected to the capacitor C1 in parallel. The capacitors C1 and C2 constitute the capacitor Cb. Since the capacitances of the capacitors C1 and C2 are directly proportional to the area covered by the metal layers M0 and M1, and the conductive channel layer M2, the size of the capacitor Cb is reduced effectively.

In this embodiment, the area covered by the metal layers M0 and M1, and the conductive channel layer M2 is adjusted to increase the capacitance of the capacitor Cb. In a display mode, the capacitor Cb stores more charges. In a touch sensing mode following the display mode, even if the voltage of the capacitor Cb is reduced because of the current leakage, the capacitor Cb has enough charges to drive the transistor T1 in the display mode following the touch sensing mode. Therefore, the transistor T1 is capable of providing the appropriate shifted signal.

In one embodiment, after the patterns of the metal layers M0 and M1, and the conductive channel layer M2 are formed, the metal layer M0 comprises mask electrodes, the metal layer M1 comprises scan electrodes and scan lines, and the conductive channel layer M2 comprises data electrodes and data lines. In another embodiment, after the patterns of the metal layers M0 and M1, and the conductive channel layer M2 are formed, the metal layer M0 comprises scan electrodes and scan lines, the metal layer M1 comprises data electrodes and data lines, and the conductive channel layer M2 comprises sensing lines, such as the signal lines S1~S6 shown in FIG. 1.

Figure 5A:
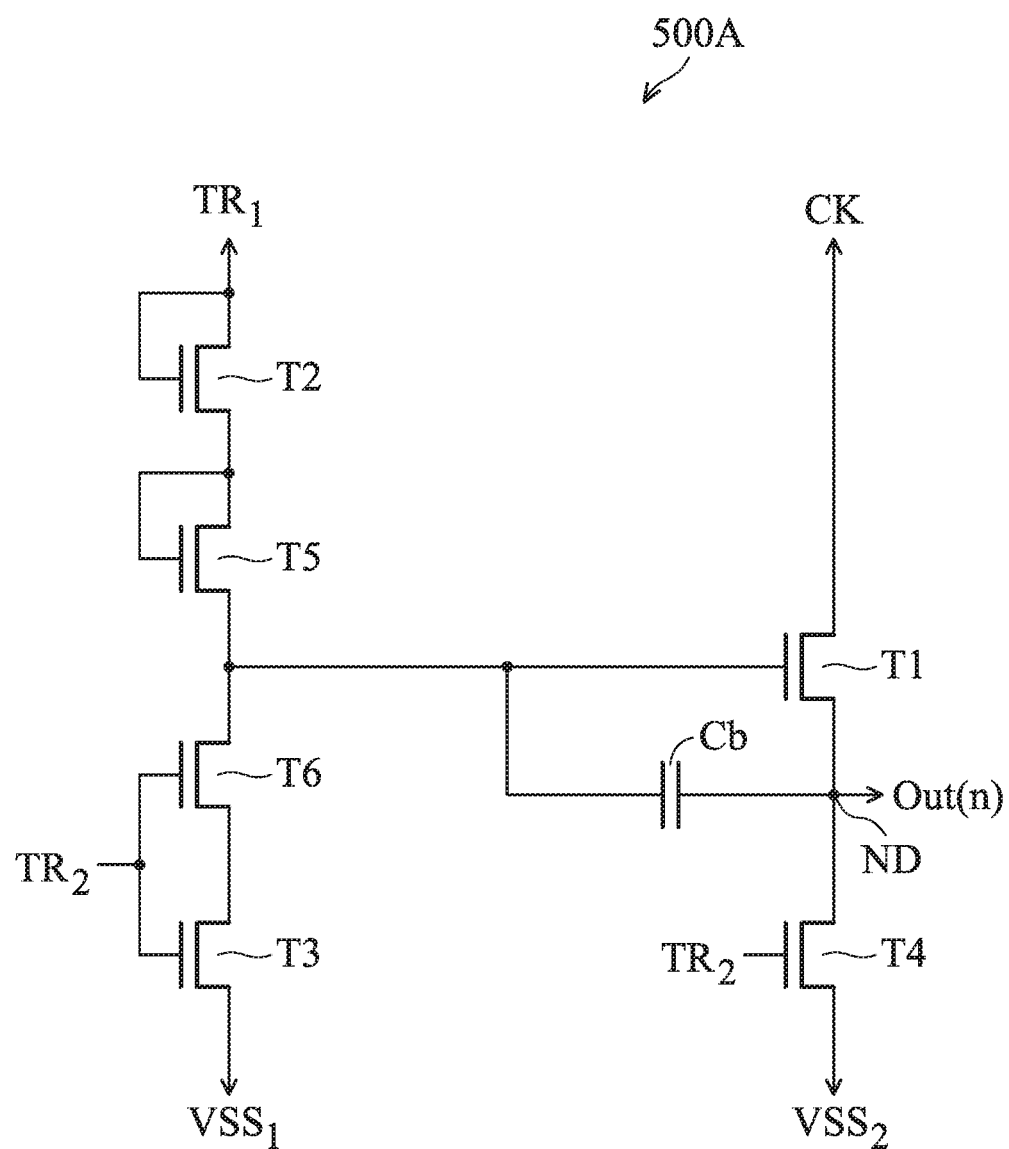
FIGS. 5A and 5B are schematic diagrams of exemplary embodiments of the shift register unit according to an embodiment of the present invention.
Figure 5B:
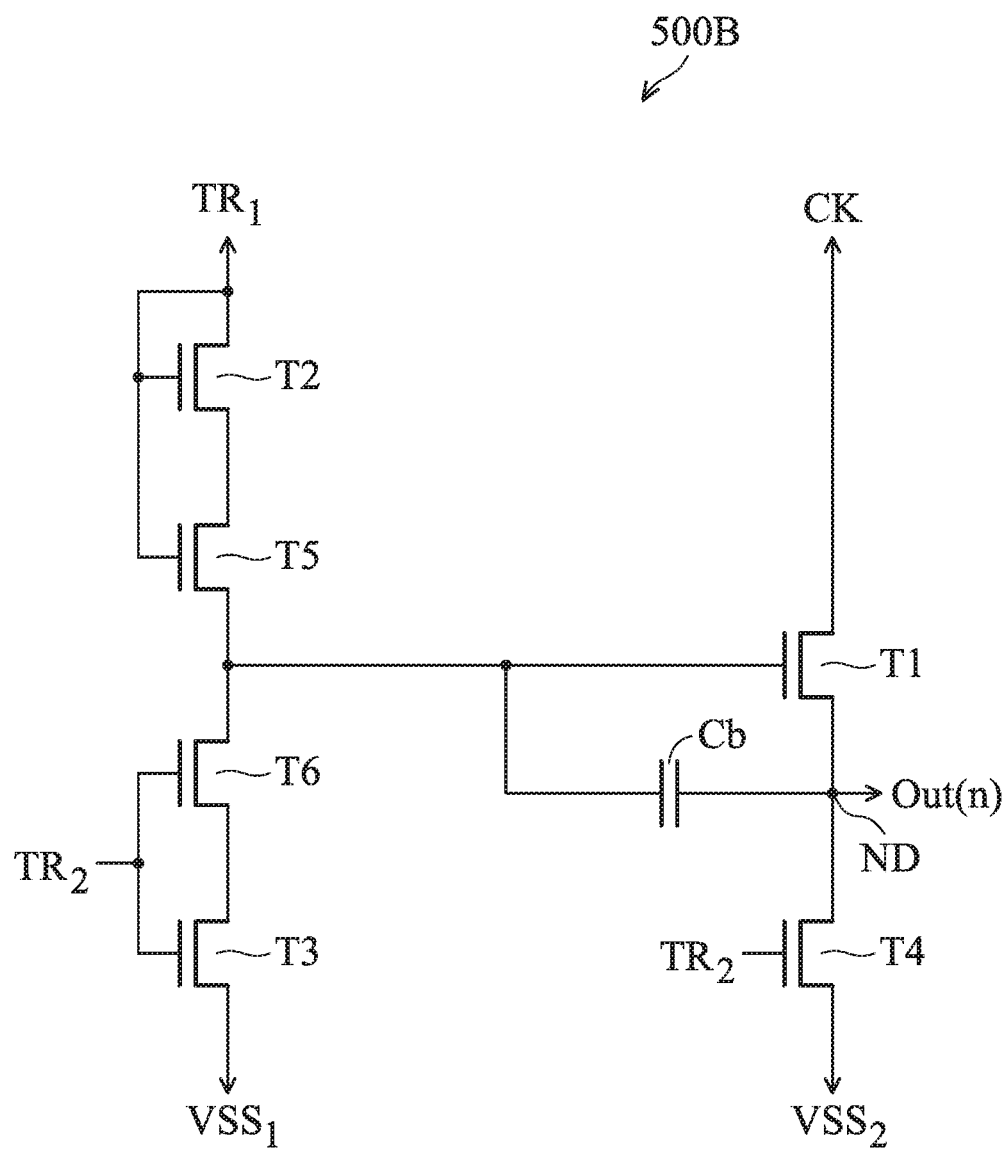

FIGS. 5A and 5B are schematic diagrams of exemplary embodiments of the shift register unit according to an embodiment of the present invention. FIGS. 5A and 5B are similar to FIG. 3 except that the shift register units 500A and 500B shown in FIGS. 5A and 5B comprise the transistors T5 and T6 to reduce the current leakages of the shift register units 500A and 500B.

The transistor T5 is coupled between the transistors T2 and T3. The transistor T6 is coupled between the transistors T5 and T3. In FIG. 5A, the drain and the gate of the transistor T5 are connected with one another. The source of the transistor T5 is coupled to the drain of the transistor T6. The source of the transistor T6 is coupled to the drain of the transistor T3. The gate of the transistor T6 receives the trigger signal $TR_2$. In FIG. 5B, the drain of the transistor T5 is coupled to the source of the transistor T2. The gate of the transistor T5 is coupled to the gate of the transistor T2. The source of the transistor T5 is coupled to the drain of the transistor T6. The transistors T5 and T6 are used to reduce the current leakage of the capacitor Cb. Therefore, in the touch sensing mode and the display mode, the capacitor Cb has enough voltage to direct the transistor T1 to generate the corresponding shifted signal, such as Out(n).

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A touch display device, comprising:
a touch display panel comprising:
a plurality of pixels; and
a first shift register unit configured to provide a first shifted signal to a first portion of the pixels, and the first shift register unit comprising:
a first transistor comprising a first drain receiving a clock signal, a first source coupled to an output node, and a first gate outputting the first shifted signal;
a second transistor comprising a second drain receiving a first trigger signal, a second source coupled to the first gate, and a second gate coupled to the second drain;
a third transistor comprising a third drain coupled to the second source, a third source receiving a first operation voltage, and a third gate receiving a second trigger signal;
a fourth transistor comprising a fourth drain coupled to the first source, a fourth source receiving a second operation voltage, and a fourth gate receiving the second trigger signal; and
a capacitor coupled between the first gate and the first source, and the capacitor comprising:
a first metal layer;
a second metal layer disposed on the first metal layer;
a passivation layer disposed between the first metal layer and the second metal layer, and the passivation layer electrically isolating the first metal layer and the second metal layer; and
a third metal layer disposed on the second metal layer, wherein the first metal layer comprises a mask electrode, the second metal layer comprises a scan line, and the third metal layer comprises a data line.

2. The touch display device as claimed in claim 1, wherein in a display mode, the second operation voltage is at a first level, and in a touch sensing mode, the second operation voltage is at a second level greater than the first level.

3. The touch display device as claimed in claim 2, wherein in the display mode and the touch sensing mode, the first operation voltage is at the first level.

4. The touch display device as claimed in claim 2, wherein the first metal layer comprises a scan line, the second metal layer comprises a data line, and the third metal layer comprises a common electrode,
wherein in the display mode, the common electrode receives a common voltage, and in the touch sensing mode, the common electrode stops receiving the common voltage.

5. The touch display device as claimed in claim 1, further comprising:
a second shift register unit generating a second shifted signal to a second portion of the pixels according to a start signal; and
a third shift register unit generating a third shifted signal to a third portion of the pixels according to the first shifted signal, wherein the third shifted signal is served as the second trigger signal.

6. The touch display device as claimed in claim 5, wherein the second shifted signal is served as the first trigger signal, and the first trigger signal is a DC signal.

7. The touch display device as claimed in claim 1, further comprising:
a fifth transistor coupled between the second and third transistors; and
a sixth transistor coupled between the third and fifth transistors, wherein the fifth transistor comprises a fifth drain coupled to the second source, a fifth source, and a fifth gate coupled to the fifth drain, and the sixth transistor comprises a sixth drain coupled to the fifth source, a sixth source coupled to the third drain, and a sixth gate receiving the second trigger signal.

8. A touch display device comprising:
a substrate comprising a plurality of pixels and a gate on panel (GOP) circuit comprising a first shift register unit, wherein the first shift register unit is configured to provide a first shifted signal to a portion of the pixels and comprises:
a first transistor comprising a first drain receiving a clock signal, a first source coupled to an output node to output the first shifted signal, and a first gate;
a second transistor comprising a second drain receiving a first trigger signal, a second source coupled to the first gate, and a second gate coupled to the second drain;

a third transistor comprising a third drain coupled to the second source, a third source a first operation voltage, and a third gate receiving a second trigger signal;

a fourth transistor comprising a fourth drain coupled to the first source, a fourth source receiving a second operation voltage, and a fourth gate receiving the second trigger signal; and a capacitor coupled to the first gate and the first source, and the capacitor comprising:

a first metal layer;

a second metal layer disposed on the first metal layer;

a passivation layer disposed between the first metal layer and the second metal layer, and the passivation layer electrically isolating the first metal layer and the second metal layer; and a third metal layer disposed on the second metal layer;

a sensing electrode formed on the substrate;

a liquid-crystal layer disposed on the sensing electrode; and a color filter layer disposed on the liquid-crystal layer, wherein the first metal layer comprises a mask electrode, the second metal layer comprises a scan line, and the third metal layer comprises a data line.

9. The touch display device as claimed in claim 8, wherein the first metal layer comprises a scan line, the second metal layer comprises a data line, and the third metal layer comprises the sensing electrode, wherein in a display mode, the sensing electrode receives a common voltage, and in a touch sensing mode, the sensing electrode stops receiving the common voltage.

10. The touch display device as claimed in claim 8 wherein the substrate is an in-cell touch panel.

* * * * *